Feb. 9, 1932.  A. DREYER  1,844,567
HANDLE FOR BOUQUETS
Filed Aug. 10, 1927

INVENTOR
Adolph Dreyer
BY
J. W. M. Ellis
ATTORNEY

Patented Feb. 9, 1932

1,844,567

UNITED STATES PATENT OFFICE

ADOLPH DREYER, OF BUFFALO, NEW YORK

HANDLE FOR BOUQUETS

Application filed August 10, 1927. Serial No. 211,969.

The principal object of my invention has been to provide a device for use in connection with a bouquet whereby the bouquet may be conveniently carried or handled.

Another object has been to provide a device which increases the value and salability of a bouquet.

Moreover, my device, when used in connection with a bouquet, produces the effect of a flower basket at a cost very much less than that of a flower basket.

Furthermore, because of the form of my handle, cards bearing greetings or sentiments, as well as novelties, may be easily attached to the handle of the bouquet and they may therefore be placed in such a position that they will always be kept in view.

The above objects and advantages have been accomplished by the device shown in the accompanying drawings, of which:

Figure 1:
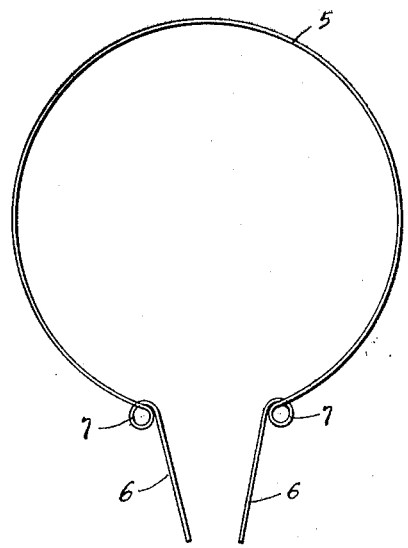
Fig. 1 is a side view of my device.

The device is preferably made of wire or any desired cross-section, which is formed with a handle portion 5. This handle portion may be shaped in the form of a circle as shown in Fig. 1 or it may be formed in any other suitable and desired shape. Thus the handle portion may be shaped to harmonize with the sentiment of certain days, such, for example, as on St. Valentine's day, the handle portion may be made in the shape of a heart.

Each of the ends of the handle portion 5 terminates in stem portions 6. Between each of the stem portions 6 and the handle is formed a loop portion 7. These loop portions may be in the form of a return bend, as shown in the drawings, or may be formed in any other suitable manner so long as they will offer abutments or projections which will prevent the handle from being withdrawn from the bouquet after the bouquet has been bound together. The stem portions 6 project downwardly at an angle so that when in use they will lie substantially parallel with the stems of the flowers of the bouquet. If desired, the stem portions 6 may project inwardly at an angle to the stems, such angle, however, being insufficient to permit the handle to oscillate or rock with respect to the bouquet. The stem portions may be bent so as to assume an angle of approximately 40° with a vertical axis of the device without permitting such oscillating or rocking movement.

Figure 2:
Fig. 2 is a side view of a bouquet showing the device in use.

In Fig. 2, I show the device attached to the bouquet 8, the loop portions 7 being shown in dotted lines as well as the stem portions 6. The bouquet may be arranged about the device, or it may first be assembled and the device inserted in the completed bouquet. The wire or cord which fastens the bouquet together is preferably passed through the loop portions 7 or around the upper outside of them, so as to firmly attach the device to the bouquet.

As shown in Fig. 2, a card 9 may be attached to the handle in such a position that it will always be visible, or any suitable novelty may be likewise attached to the handle. Furthermore, asparagus fern 10 or other trailing vegetation may be interwined or wound about the handle so as to either build the bouquet around the handle or conceal the wire from which the handle is formed.

Obviously, some modifications of the details herein shown and described may be made without departing from the spirit of my invention, or the scope of the appended claims, and I do not, therefore, wish to be limited to the exact form herein shown and described, the form shown being merely a preferred form thereof.

Having thus described my invention what I claim is:

1. The combination with the stems of a bouquet, of a carrier, comprising a resilient handle portion, downwardly extending stem portions, the stem portions having their axes substantially parallel with the stems of the bouquet, abutment means formed on the carrier, and fastening means engaging the abutments for securing the carrier to the bouquet.

2. The combination with the stems of a bouquet, of a carrier, comprising a resilient handle portion, downwardly extending stem portions, the stem portions having their axes substantially parallel with the stems of the bouquet, abutment means formed on the carrier betwen the handle and the stem portions, and fastening means engaging the abutments for securing the carrier to the bouquet.

In testimony whereof, I have hereunto signed my name.

ADOLPH DREYER.